United States Patent [19]

Nobumoto et al.

[11] Patent Number: 4,610,183

[45] Date of Patent: Sep. 9, 1986

[54] CONTROL OF A STEPLESSLY VARIABLE VEHICLE TRANSMISSION

[75] Inventors: Kazutoshi Nobumoto; Shizuo Sumida, both of Hiroshima, Japan

[73] Assignee: Mazda Motor Corporation, Hiroshima, Japan

[21] Appl. No.: 666,666

[22] Filed: Oct. 31, 1984

[30] Foreign Application Priority Data

Oct. 31, 1983 [JP] Japan .................. 58-202515
Oct. 31, 1983 [JP] Japan .................. 58-202516
Oct. 31, 1983 [JP] Japan .................. 58-202517

[51] Int. Cl.⁴ .......................................... B60K 41/12
[52] U.S. Cl. ...................................... 74/866; 74/867; 474/28
[58] Field of Search .................. 474/18, 28; 74/866, 74/867, 868, 865

[56] References Cited

U.S. PATENT DOCUMENTS 3,895,542  7/1975  Miyauchi .................. 74/868
4,313,354  2/1982  Iwanaga et al. ............. 74/868
4,411,174 10/1983  Yokoi et al. ............... 74/866
4,466,312  8/1984  Oguma ..................... 74/868

FOREIGN PATENT DOCUMENTS

2752322  6/1978  Fed. Rep. of Germany ........ 474/18
4532567 10/1970  Japan .
0093312  9/1983  United Kingdom ............. 74/866
2133095  7/1984  United Kingdom ............. 74/865

Primary Examiner—Lawrence J. Staab
Assistant Examiner—Martin G. Belisario
Attorney, Agent, or Firm—Fleit, Jacobson, Cohn & Price

[57] ABSTRACT

A steplessly variable vehicle transmission of a belt-pulley type which is provided with an electronic control unit for controlling the speed ratio of the transmission in accordance with the engine operating condition, such as the engine load and the engine speed. The control unit has a shift control map which includes a shift-up zone, a shift-down zone and a speed ratio hold zone between the shift-up and shift-down zones so that the speed ratio of the transmission is maintained constant in acceleration and deceleration as long as the engine operating condition is in the hold zone.

10 Claims, 10 Drawing Figures

CONTROL OF A STEPLESSLY VARIABLE VEHICLE TRANSMISSION

BACKGROUND OF THE INVENTION

1. Field of the Invention

The present invention relates to a steplessly variable vehicle transmission and more particularly to a speed ratio control of such a vehicle transmission. More specifically, the present invention pertains to an automatic speed ratio control system for a steplessly variable vehicle transmission.

2. Description of the Prior Art

Conventionally, it has been known to control a steplessly variable vehicle transmission automatically in accordance with the engine speed and the engine load so that the speed ratio of the transmission be adjusted to a value wherein the most efficient engine operation can be performed to thereby improve fuel economy. For example, Japanese patent publication 45-32567 discloses a transmission provided with a speed ratio control system including a control value which is associated with a governor mechanism responsive to the engine speed and a spring of which strength is adjusted in accordance with the engine load, such as the engine throttle valve opening.

In vehicles provided with this type of automatic transmissions, there is a problem that the response of the vehicle to an operation of the engine power control member such as the throttle valve control foot pedal is noticeably different from that of vehicles provided with manually operated gear transmissions. With such gear transmissions, when the engine control member is actuated to accelerate the vehicle, the engine speed is increased proportionally to an increase in the vehicle speed so that the driven can obtain a feeling of desired acceleration. In the vehicles having the aforementioned steplessly variable transmissions, however, the speed ratio of the transmission is automatically adjusted so that the engine is operated with a speed which is determined in relation to the position of the engine control member, for example, the engine throttle valve opening. Therefore, it is impossible to obtain a feeling of rapid acceleration as in the vehicles having gear transmissions.

OBJECT OF THE INVENTION

It is therefore an object of the present invention to provide an automatic speed ratio control system for a steplessly variable power transmission in which the feelings of rapid acceleration can be obtained.

Another object of the present invention is to provide an automatic speed ratio control system for a steplessly variable power transmission which can provide an engine speed increase in response to an increase in the vehicle speed so that a feeling of rapid acceleration is obtained.

A further object of the present invention is to provide a control system for a steplessly variable transmission in which the speed ratio of the transmission is maintained substantially constant for a certain engine speed range so that the engine can be accelerated in proportion to an increase in the vehicle speed in that speed range to thereby make it possible obtain a feeling of acceleration.

SUMMARY OF THE INVENTION

According to the present invention, the above and other objects can be accomplished by a steplessly variable transmission device comprising steplessly variable power transmission means including input means adapted to be driven by engine means, output means and variable speed ratio means between said input and output means for steplessly changing a speed ratio between said input and output means, actuator means for actuating the variable speed ratio means for obtaining a desired value of said speed ratio, control means responsive to an operating condition of the engine means to produce an output signal in accordance with speed ratio control characteristics having a shift-up zone, a shift-down zone and a speed ratio hold zone for controlling the actuator means so that a desired value of the speed ratio is obtained. The control means may comprise a microprocessor and include speed ratio shift map means for determining the shift-up zone, the shift down zone and the speed ratio hold zone as functions of the engine speed and the engine load. The control means may further include means for comparing the operating condition of the engine means with the shift map means for producing the output signal based on the result of the comparison.

In a preferable aspect of the present invention, means may be provided for changing the width of the speed ratio hold zone. In one mode of the present invention the width of the speed ratio hold zone is changed by manual means. In another mode of the present invention, the width of the speed ratio hold zone is changed automatically depending on the vehicle operating condition so that the hold zone is wider in accelerating and decelerating periods than in normal operating periods.

DESCRIPTION OF THE PREFERRED EMBODIMENT

Figure 1:
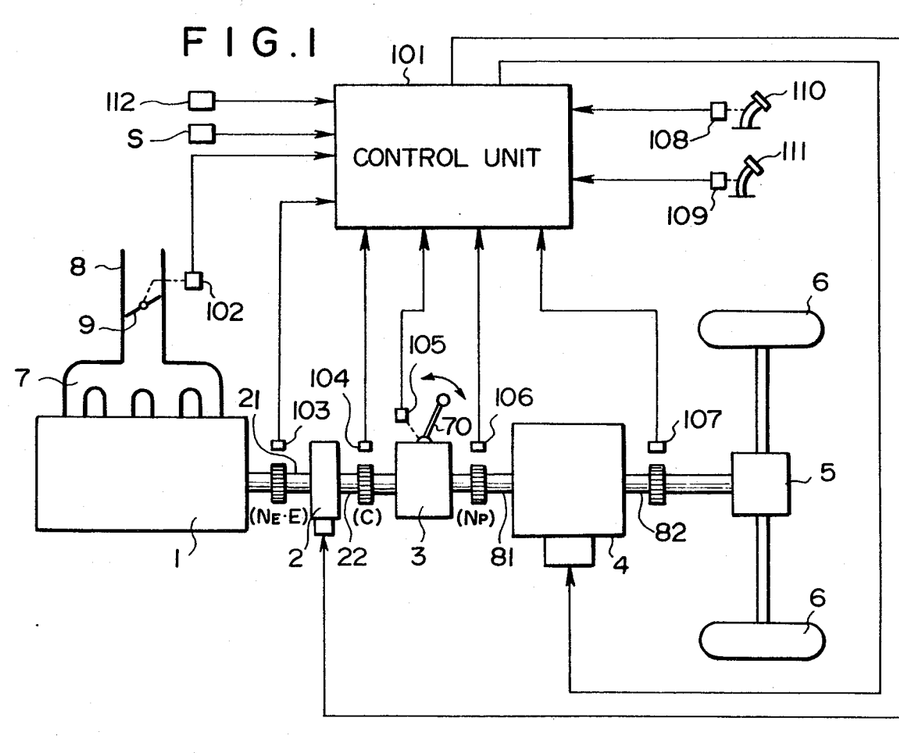
FIG. 1 is a diagrammatical illustration of the transmission control system in accordance with one embodiment of the present invention.

Referring to the drawings, particularly to FIG. 1, there is shown an engine 1 having an output shaft connected with an input member 21 of a clutch assembly 2. The clutch assembly 2 has an output member 22 which is connected through a gear box 3 with an input member 81 of a steplessly variable, belt-pulley type transmission 4. The transmission 4 has an output member 82 which is connected through a differential gear mechanism 5 with vehicle drive wheels 6.

Figure 2:
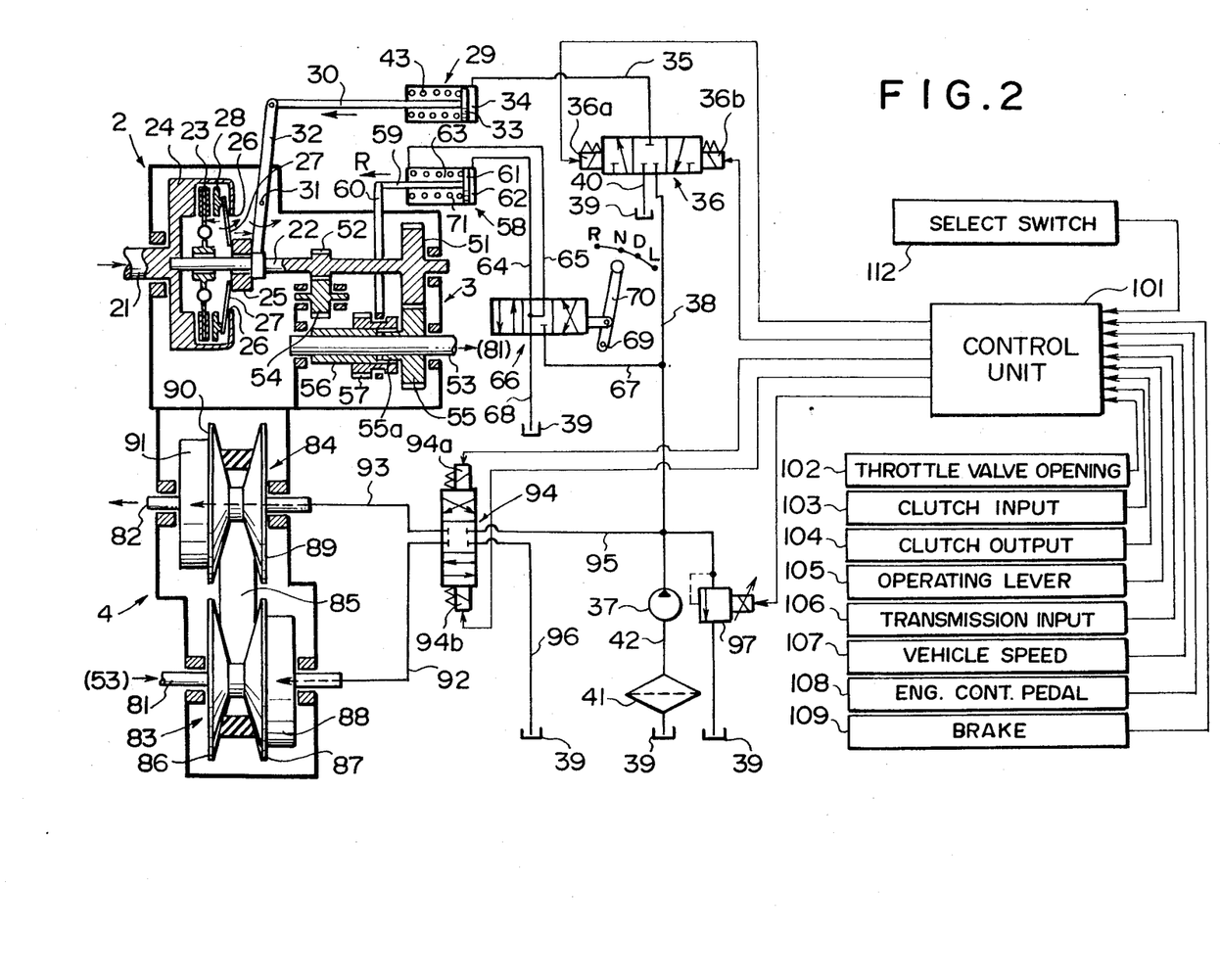
FIG. 2 is a diagrammatical illustration of the steplessly variable transmission and its control system.

The engine 1 has an intake manifold 7 which is communicating with an intake passage 8 provided with a throttle valve 9 which is operated by an engine control foot pedal 110. The vehicle is also provided with a brake pedal 111. Referring to FIG. 2, the clutch 2 includes a clutch disc 23 engaged through spline teeth with the output member 22. The input member 21 is formed integrally with a flywheel 24 which is placed opposite to the clutch disc 23. In order to force the clutch disc 23 into a friction contact with the flywheel 24, there is provided a pressure plate 28 which is engaged by a dish-shaped spring 27 swingable about a fulcrum 26. A sleeve 25 is placed on the output member 22 for axial slidable movement and rotation with respect to the output member 22. The sleeve 25 is adapted to engage the spring 27 to force the radially inner edge of the spring 27 in axial direction. When the sleeve 25 is shifted leftward, the radially inner edge of the spring 27 is forced leftward so that the spring 27 is swung about the fulcrum 26 producing a rightward movement of the spring 27 at the radially outer edge to release the pressure plate 28 from the clutch disc 23. Thus, the clutch 2 is disengaged. When the sleeve 25 is shifted rightward, the resiliency of the spring 27 functions to move the radially outer edge of the spring 27 leftward forcing the pressure plate 28 toward the clutch disc 23. Thus, the clutch disc 23 is engaged with the flywheel 24.

In order to produce the axial movement of the sleeve 25, there is provided an actuating lever 32 which is pivotable about a pin 31 and has one end engaged with the sleeve 25. The other end of the lever 32 is connected with a piston rod 30 of a cylinder 29 having a piston 33. In the cylinder 29, there is defined a pressure chamber 32 at one side of the piston 33. At the other side, there is provided a spring 43 which forces the piston 33 toward right. Thus, the piston 33 is normally held at a rightwardly shifted position under the influence of the spring 43 to hold the sleeve 25 at the leftwardly shifted, clutch release position. When a hydraulic pressure is introduced into the chamber 34, the piston 33 is moved leftward to thereby move the sleeve to the rightwardly shifted, clutch engage position.

There is provided a hydraulic circuit including a hydraulic pump 37 which draws hydraulic oil from a reservoir 39 through a strainer 41 and a suction line 42 and discharges a pressurized oil to a pressure line 38. The pressure line 38 is connected through a three-way solenoid valve 36 to a clutch control line 35 which leads to the pressure chamber 34. The solenoid valve 36 includes an engaging solenoid 36a and a disengaging solenoid 36b. When the engaging solenoid 36a is energized, the valve 36 connects the pressure line 38 to the clutch control line 35 but, when the disengaging solenoid 36b is energized, the line 35 is disconnected from the line 38 and opened to a line 40 leading to the reservoir 39. When both of the solenoids 36a and 36b are de-energized, the line 35 is closed and the piston 33 and the piston rod 30 are locked.

The gear box 3 includes a first gear 51 and a second gear 52 having a diameter smaller than the gear 51, both formed on the output member 22 of the clutch 2. There is provided an output shaft 53 which is parallel with the output member 22 of the clutch 2. Between the shafts 22 and 53, there is a counter-shaft provided with a reverse counter gear 54 which is in meshing engagement with the second gear 52. An intermediate gear 55 is rotatably mounted on the output shaft 53 and in meshing engagement with the first gear 51. The output shaft 53 is fitted with a sleeve 56 on which a clutch gear 57 is mounted through spline teeth so that the gear 57 is axially slidable with respect to the sleeve 56 but rotates together with the sleeve 56. The intermediate gear 55 has an axially extending boss 55a having external spline teeth which are adapted to be engaged with internal spline teeth on the clutch gear 57 when the clutch gear 57 is in the position shown in FIG. 2. The clutch gear 57 can be brought into meshing engagement with the reverse counter gear 54 when it is shifted toward left. When the clutch gear 57 is in the position shown in FIG. 2, the rotation of the clutch output member 22 is transmitted through the first gear 51 and the intermediate gear 55 to the clutch gear 57 and then through the sleeve 56 to the output shaft 53 to drive the shaft 53 in the forward direction. When the clutch gear 57 is engaged with the reverse counter gear 54, the rotation of the clutch output member 22 is transmitted through the second gear 52 and the reverse counter gear 54 to the clutch gear 57 to drive the output shaft 53 in the reverse direction. The clutch gear 57 can also assume a neutral position wherein it does not engage either of the gears 54 and 55.

In order to effect the axial movement of the clutch gear 57, there is provided a cylinder 58 which has a piston 61 provided with a piston rod 59. The piston rod 59 is connected with a shift fork 60 which is in engagement with the clutch gear 57. The piston 61 defines a first pressure chamber 62 at one side thereof and a second pressure chamber 63 at the other side. In the second chamber 63, there is provided a return spring 71. The chambers 62 and 63 are connected with a three way select valve 66 which is in turn connected through a branch line 67 with the pressure line 38. The select valve 66 has a select lever 70 which is swingable about a point pin 69 to take either one of R, N, D and L positions.

In the R position of the lever 70, the valve 66 connects the pressure chamber 62 with the line 67 to draw the hydraulic pressure to this chamber 62 and opens the chamber 63 to a line 68 leading to the reservoir 39. Thus, the piston rod 59 is moved toward left until the clutch gear 57 engages the reverse counter gear 54. In the N position of the lever 70, the chambers 62 and 63 are opened to the reservoir 39 and the piston 61 is maintained by the return spring 71 at the position wherein the clutch gear 57 is free both from the gears 54 and 55. In either of the D and L positions of the lever 70, the valve 66 connects the chamber 63 to the line 67 and opens the chamber 62 through the line 68 to the reservoir 39. Thus, the piston rod 59 is moved toward right to the position shown in FIG. 2 to make the clutch gear 57 engage the intermediate gear 55.

The steplessly variable transmission 4 includes and a primary pulley assembly 83 having the aforementioned input shaft 81 and a secondary pulley assembly 84 having the aforementioned output shaft 82. The pulley assemblies 83 and 84 are connected through an endless V-belt 85. The primary pulley assembly 83 includes a stationary flange 86 secured to the input shaft 81 and a movable flange 87 which is axially movable with respect to the input shaft 81. In order to determine the axial position of the movable flange 87, there is provided a hydraulic actuator 88. As the hydraulic liquid supply to the actuator 88 increases the movable flange 87 is shifted toward the stationary flange 86 so that the effective diameter of the primary pulley assembly 83 is increased. Similarly, the secondary pulley assembly 84 includes a stationary flange 89 secured to the output shaft 82 and a movable flange 90 which is axially movable with respect to the output shaft 82. There is provided a hydraulic actuator 91 which serves to move the flange 90 in the axial direction. As the supply of hydraulic liquid to the actuator 91 increases, the movable flange 90 is shifted axially toward the stationary flange 89 so that the effective diameter of the secondary pulley assembly 84 is increased.

The hydraulic actuators 88 and 91 are connected respectively through conduits 92 and 93 with a three way solenoid valve 94 which is connected on one hand through a line 95 with the hydraulic pumps 37 and on the other hand through a line 96 with the reservoir 39. The solenoid valve 94 has a pair of solenoids 94a and 94b. When the solenoid 94a is energized, the hydraulic actuator 88 is connected with the line 95 leading to the hydraulic pump 37 whereas the hydraulic actuator 91 is opened to the line 96 leading to the reservoir 39. Thus, the effective diameter of the primary pulley assembly 83 is increased and the effective diameter of the secondary pulley assembly 84 is correspondingly decreased to thereby decrease the speed ratio. When the solenoid 94b is energized, the actuator 91 is connected with the pump 37 and the actuator 88 is opened to the reservoir 39 so that the effective diameter of the primary pulley assembly 83 is decreased and the effective diameter of the secondary pulley assembly 84 is correspondingly increased to thereby increase the speed ratio. When both the solenoid 94a and 94b are deenergized, the actuators 88 and 91 are disconnected from the lines 95 and 96 so that the speed ratio is maintained constant.

The hydraulic circuit shown in FIG. 2 includes a solenoid relief valve 96 which functions when energized to open the outlet port of the hydraulic pump 37 to the reservoir 39. In FIGS. 1 and 2, it will be noted that there is an electronic control unit 101 which is connected with outputs of a throttle valve position sensor 102 for detecting the position of the engine throttle valve 9, an engine speed sensor 103 for detecting the speed NE of the engine 1, a clutch output speed sensor 104 for detecting the speed of the clutch output member 22, a select lever position sensor 105 for detecting the position of the select lever 70, a transmission input speed sensor 106 for detecting the speed of the transmisson input shaft 81, a vehicle speed sensor 107 for detecting the vehicle speed or the speed of the transmission output shaft 82, an engine control foot pedal position sensor 108 for detecting that the foot pedal 110 is depressed beyond a predetermined position, and brake sensor 109 for detecting that the brake pedal 111 is actuated to apply vehicle brakes. There is also provided a manual switch 112 for determining the extent of a speed ratio hold zone which will be described later. The signal from the switch 112 is also supplied to the control unit 101. The control unit 101 may be comprised of a microprocessor with suitable operating programs.

Figures 3, 4:
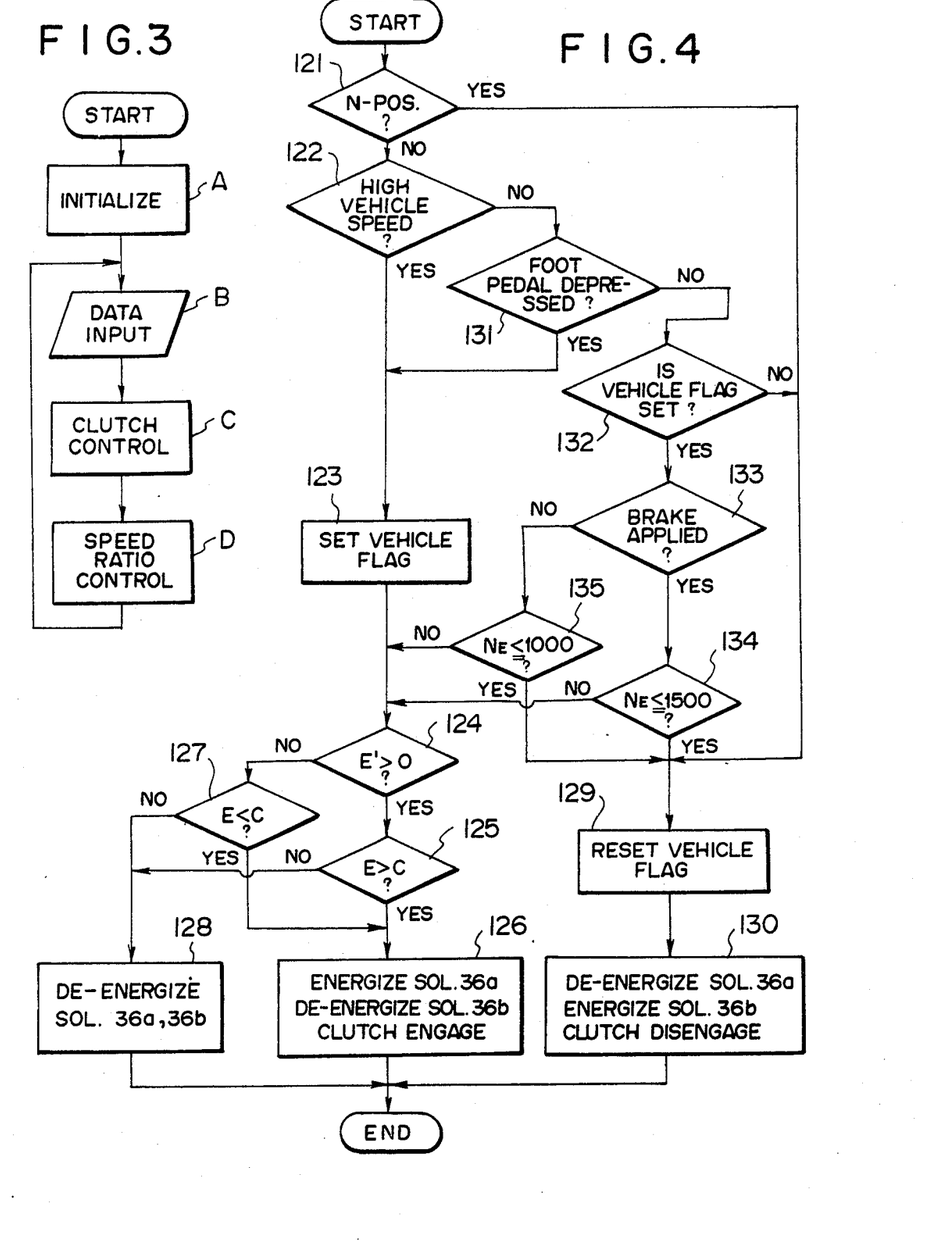
FIG. 3 is a flow chart showing the general feature of the transmission control.
FIG. 4 is a flow chart showing the clutch control routine in the transmission control.

The operation of the control unit 101 will now be described with reference to the flow charts shown in FIGS. 3 through 5. Referring at first to FIG. 3 which shows the general control, the system is at first initialized at the step A and the control unit 101 receives at the step B control data which are required for performing the control. Thereafter, the clutch control routine is carried out at the step C and the speed ratio control routine is carried out at the step D.

FIG. 4 shows the clutch control routine in which judgement is made at the step 121 as to whether the select lever 70 is at the N position. When the select lever 70 is not in the N position, the step 122 is carried out to judge whether the vehicle speed is greater than a predetermined value, for example, 10 km/h. When it is judged that the vehicle speed is greater than the predetermined value, the vehicle speed flag is set at the step 123 and the succeeding step 124 is carried out.

In the step 124, a time differential E' of the speed E of the clutch input member 21 or the engine speed NE is calculated from the output signal of the engine speed sensor 103 and a judgement is made as to whether the differential E' is positive or not. When it is judged that the time differential E' is positive and that the engine speed NE is being increased, the succeeding step 125 is carried out. In the step 125, a judgement is made as to whether or not the engine speed NE or the clutch input speed E is greater than the clutch output speed C and a further step 126 is carried out when the input speed E is greater than the output speed C. In the step 126, the solenoid 36a is energized and the solenoid 36b is de-energized to engage the clutch 2 so that the torque transmitting capacity of the clutch 2 is increased. When the judgement in the step 125 is that the input speed E is not greater than the output speed C, the process is proceeded to the step 128 wherein both the solenoids 36a and 36b are de-energized so that the torque transmitting capacity of the clutch 2 is maintained.

When it is judged in the step 124 that the time differential E' is not greater than zero, the step 127 is carried out to judge whether the clutch input speed E is smaller than the clutch output speed C. When the judgement is that the clutch input speed E is not smaller than the clutch output speed C, the aforementioned step 128 is carried out to maintain the torque transmitting capacity of the clutch 2. The progress from the step 124 to the step 125 shows that the clutch input speed E is being increased, and the progress from the step 125 to the step 126 shows that the clutch input speed E is greater than the clutch output speed C so that it is required to increase the torque transmitting capacity of the clutch 2. This represents a situation wherein the clutch 2 is transmitting a driving power with a certain slip between the input shaft 21 and the output shaft 22. The progress from the step 125 to the step 128 shows that the torque transmitting capacity of the clutch 2 is substantially balanced to the load on the output shaft 22 so that the clutch engagement pressure is maintained as it is.

The progress from the step 124 to the step 127 represents a situation wherein the clutch input speed E is being decreased so that it is necessary to judge whether the clutch input speed E is smaller than the clutch output speed C. The progress from the step 127 to the step 126 represents for example a sitution wherein the operating lever 70 is shifted from the N position to the D position while the vehicle is running. In this situation, the clutch 2 is not fully engaged and the torque is transmitted with a certain slip between the clutch input and output shafts. The progress from the step 127 to the step 128 represents a decelerating operation under an engine brake function.

When it is judged in the step 121 that the lever 70 is in the N position, the vehicle speed flag is reset in the step 129 and the step 130 is then carried out. In the step 130, the solenoid 36a of the solenoid valve 36 is de-energized and the solenoid 36b is energized to disengage the clutch 2.

When it is judged in the step 122 that the vehicle speed is smaller than the predetermined value, a judgement is made in the step 131 as to whether the foot pedal 110 is depressed beyond the predetermined position. If the answer is No, it is judged that the operator is not requiring a large engine output power and a judgement is made in the step 132 as to whether or not the vehicle speed flag is set. When the vehicle speed flag is set it is judged that the vehicle speed is not sufficiently decreased so that a further judgement is made in the step 133 as to whether the vehicle brake is applied by depressing the brake pedal 111. When the vehicle brake is applied, the step 134 is carrried out to judge whether the engine speed NE is not greater than 1500 rpm. If the judgement is that the engine speed NE is not greater than 1500 rpm, the steps 129 and 130 are carried out. When it is judged in the step 133 that the vehicle brake is not applied, the step 135 is carried out to judge whether the engine speed is not greater than 1000 rpm. When the judgement is that the engine speed is not greater than 1000 rpm, the steps 129 and 130 are carried out to disengage the clutch 2. When it is judged in the step 134 that the engine speed NE is greater than 1500 rpm or in the step 135 that the engine speed NE is greater than 1000 rpm, the step 124 is carried out.

As described, the clutch 2 is disengaged under different engine speeds depending on whether the vehicle brake is applied or not. This is due to a consideration that, when the vehicle brake is supplied, the vehicle speed decrease is faster than when the vehicle brake is not applied so that there is a greater risk of engine stop under the brake application. When it is judged in the step 132 that the vehicle speed flag is not set the steps 129 and 130 are carried out to disengage the clutch 2 so as to prevent engine stop.

Figure 7:
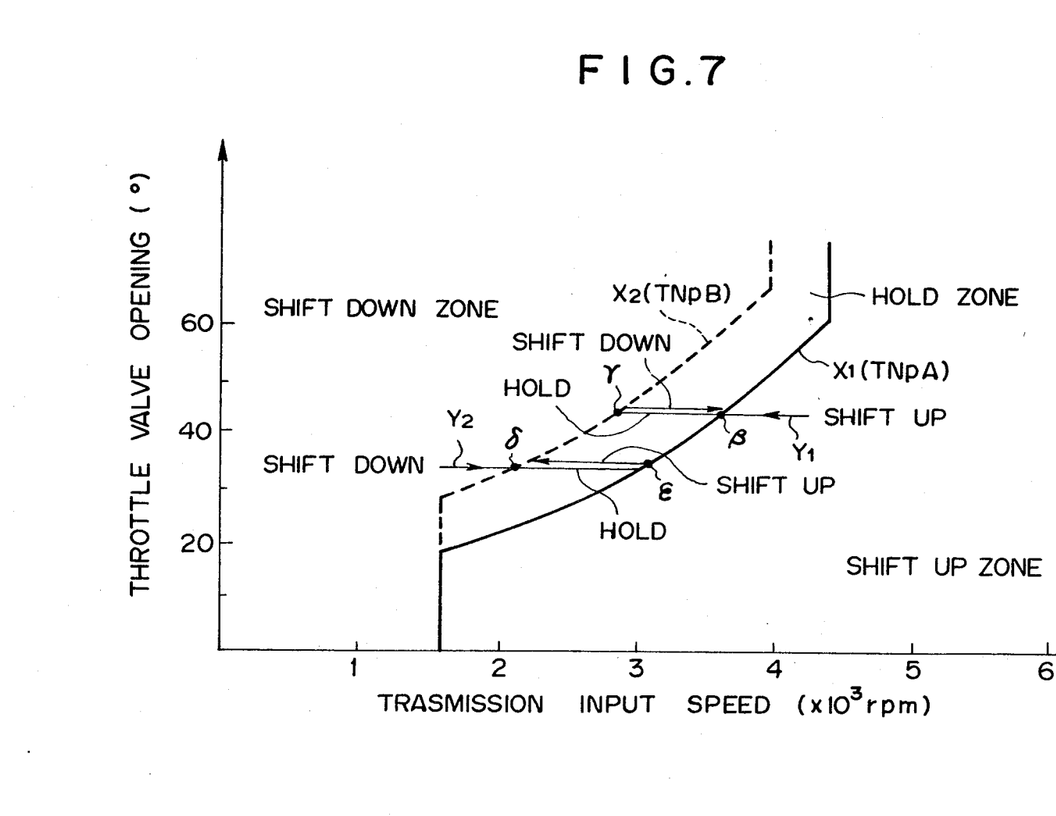
FIG. 7 is a diagram showing an example of shift control map.

For the speed ratio control, the control unit 101 includes a memory memorizing a control map which includes as shown in FIG. 7 a shift curve $X_1$ which is a function of the engine throttle valve opening and the input speed of the steplessly variable transmission 4. The curve $X_1$ is used to determine a desired transmission input speed TNPA under a given engine throttle valve opening. There is also provided a second shift curve $X_2$ which is drawn by subtracting a constant value M from the value on the curve $X_1$. The curve $X_2$ is used to determine a second desired transmission input speed TNPB which is smaller than the speed TNPA. In the map shown in FIG. 7, the area leftside the curve $X_2$ is a shift down zone wherein the speed ratio of the transmission is to be increased whereas the area rightside the curve $X_1$ is a shift up zone wherein the speed ratio of the transmission is to be decreased. The area between the curves $X_1$ and $X_2$ is the hold zone wherein the speed ratio of the transmission is maintained as it is.

Figures 5, 5B:
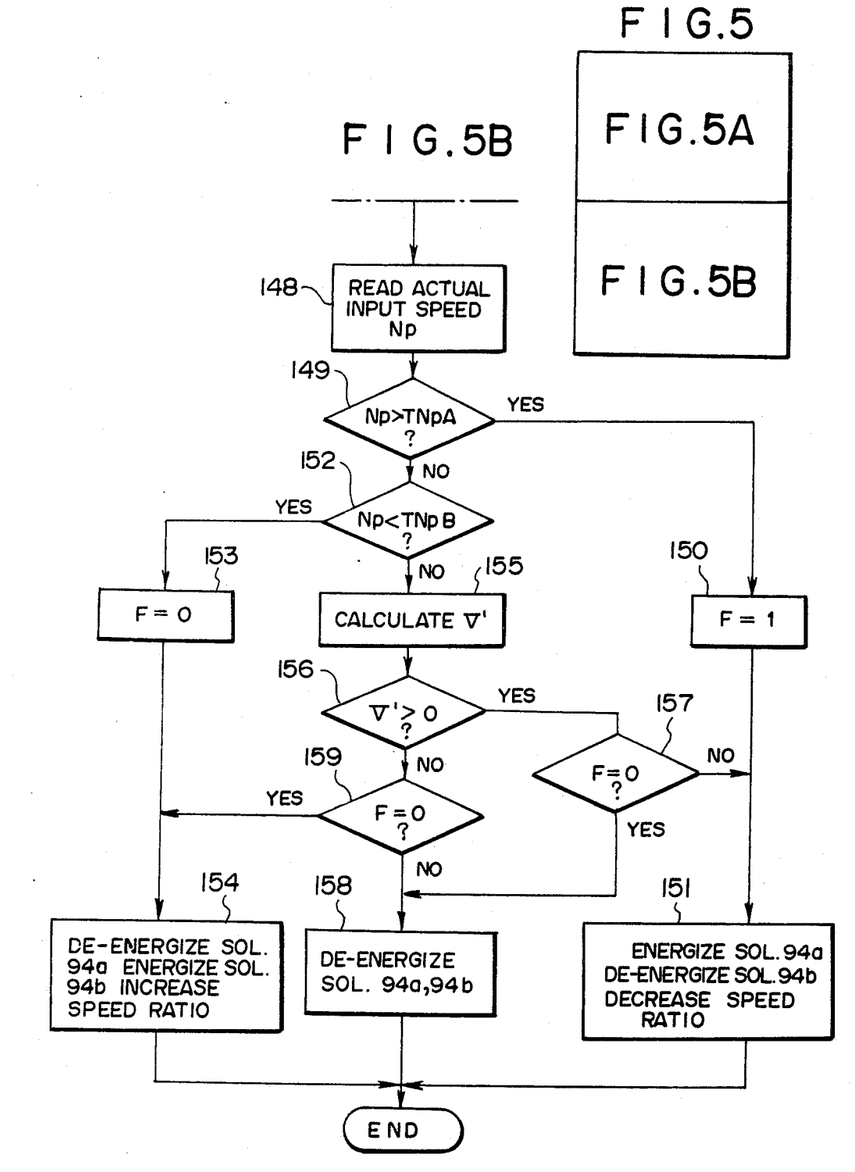
FIG. 5 is a schematic illustration showing the relationship of the flow charts in FIGS. 5A and 5B.
FIGS. 5A and 5B represent a flow chart showing the speed ratio control routine.
Figure 6:
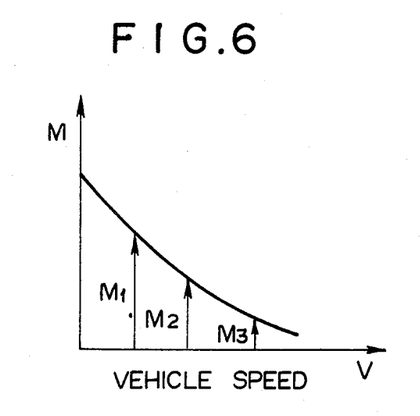
FIG. 6 is a diagram for determining a coefficient which is used for setting the width of the speed ratio hold zone.

Referring now to FIG. 5, in the speed ratio control, a judgement is at first made in the step 140 as to whether the manual mode is selected by the manual switch S and, when it is judged that the automatic mode is selected, the engine control foot pedal position $\alpha$ is read in the step 141. Thereafter, a judgement is made in the step 142 as to whether the operating lever 70 is in the L position and, when it is judged that the lever 70 is in the L position, a calculation is made by adding a constant A to the pedal position $\alpha$ in the step 143. Then, based on thus calculated pedal position value $\alpha$, a desired transmission input speed TNPA is read from the map in the step 144. When it is judged in the step 142 that the lever 70 is not in the L-position, the step 144 is carried out based on the actual foot pedal position $\alpha$. Thereafter, the vehicle speed V is read in the step 145 and the value M is read in the step 146 from the map shown in FIG. 6. The value M is function of the vehicle speed and it decreases as the vehicle speed increase. In the succeeding step 147, the second desired vehicle speed TNPB is calculated by subtracting the value M from the first desired value TNPA and the step 148 is carried out to read the actual transmission input speed NP.

Figure 5A:
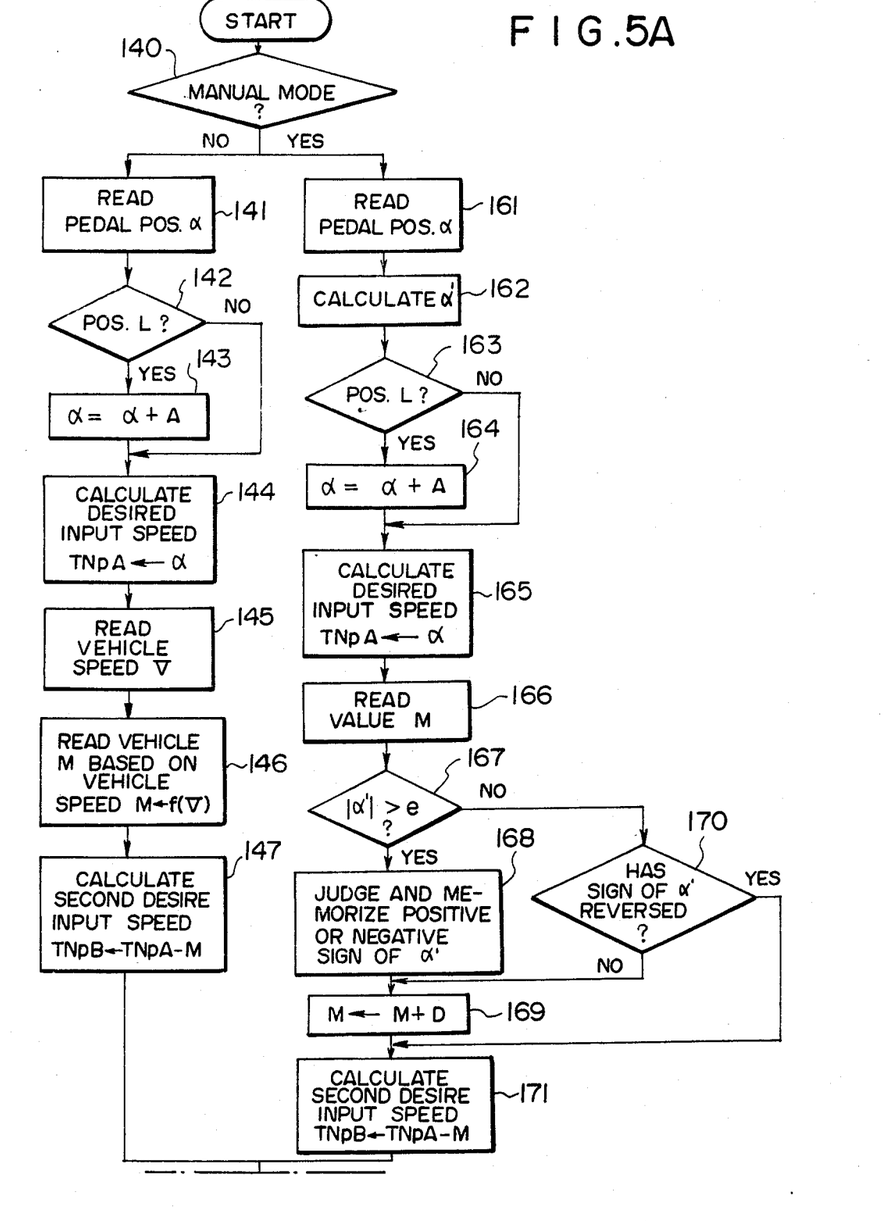

Thereafter, the actual transmission input speed NP is compared with the speeds TNPA and TNPB in the steps 149 and 152. When it is judged that the actual speed NP is greater than the speed TNPA, the flag F is set to "1" and the step 151 is carried out to energize the solenoid 94a and de-energize the solenoid 94b so a shifting up is made by decreasing the speed ratio. When it is judged that the actual speed NP is smaller than the speed TNPB, the flag F is set to "0" in the step 153 and the step 154 is carried out to de-energize the solenoid 94a and energize the solenoid 94b so that a shifting down is carried out by increasing the speed ratio. When it is judged that the actual speed NP is between the speeds TNPA and TNPB, the time differential V' of the vehicle speed V is calculated in the step 155 and a judgement is made in the step 156 as to whether the differential V' is greater than zero. If the answer is YES, the step 157 is carried out to judge the position of the flag F. If the flag F is set to "1", the step 151 is carried out to decrease the speed ratio. If the flag F is in "0" position, the step 158 is carried out to de-energize both the solenoids 94a and 94b so that the speed ratio is maintained as it is.

When it is judged in the step 156 that the differential V' is not greater than zero, the position of the flag F is judged in the step 159 and if the flag F is in the position "0", the step 154 is carried out to increase the speed ratio. If the flag is in the position "1", the step 158 is carried out to maintain the speed ratio.

The process from the step 149 through the step 150 to the step 151 corresponds to a shift up operation as shown for example by a line $Y_1$ in FIG. 7 and the process is continued until the shift up operation is made to the point $\beta$. The process from the step 149 through the steps 152, 155, 156 and 159 to the step 158 corresponds to an operation wherein the speed ratio is maintained while the transmission input speed is decreased a shown by a line from the point $\beta$ to the point $\gamma$ or the transmission input speed is maintained constant. The process from the step 149 through the steps 152, 155, 156 and 159 to the step 154 represents the situation wherein a shift down is carried out and the transmission input speed is increased as shown by a line from the point $\gamma$ to the point $\beta$. The process from the step 149 through the steps 152 and 153 to the step 154 corresponds to a shift down operation as shown for example by a line $\gamma_2$.

The process from the step 149 through the steps 152, 155, 156 and 157 to the step 158 corresponds to a situation wherein the speed ratio is maintained constant while the transmission input speed is increased as shown by a line between the point $\zeta$ to the point $\epsilon$ or the transmission input speed is maintained constant. The process from the step 149 through the steps 152, 155, 156 and 157 to the step 151 corresponds to a situation wherein a shifting up is being carried out as shown by a line from the point $\epsilon$ to the point $\zeta$.

As described, when the vehicle speed is being decreased, the speed ratio is maintained constant in the hold zone until the transmission input speed NP reaches the speed TNPB so that it is possible to obtain a vehicle deceleration under an engine brake function as in a vehicle having a gear transmission. As soon as the transmission input speed NP reaches the value TNPB, a shift down is carried out until the input speed NP reaches the value TNPA. When the vehicle speed is being increased for acceleration, the speed ratio is maintained constant in the hold zone until the transmission input speed is increased to the value TNPA so that the vehicle speed is increased in proportion to the engine speed. As soon as the engine speed reaches the value TNPA, a shifting up is carried out until the input speed NP is decreased to the value TNPB.

Figure 8:
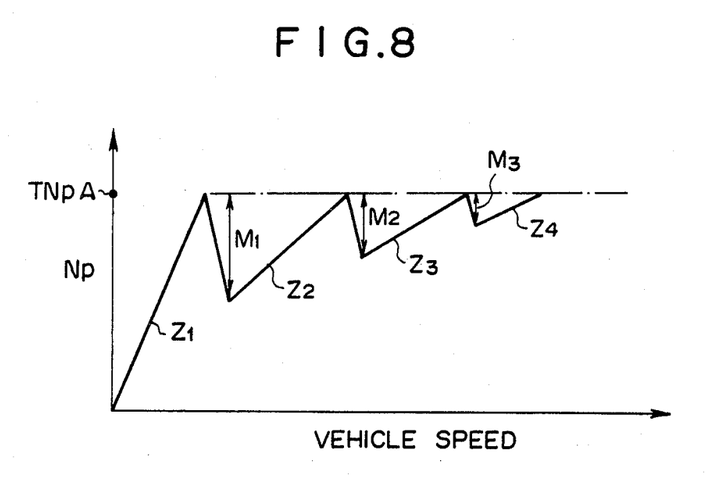
FIG. 8 is a diagram showing an example of acceleration in accordance with the control of the present invention.

FIG. 8 shows an acceleration in the transmission control system the embodiment described above. The straight lines $Z_1$, $Z_2$, $Z_3$ and $Z_4$ show accelerations under constant speed ratios. It will be understood that the acceleration is similar to that in a vehicle having a four stage gear transmission. The slopes of the lines $Z_1$, $Z_2$, $Z_3$ and $Z_4$ are determined by the values $M_1$, $M_2$ and $M_3$.

When it is judged in the step 140 that the manual mode is selected, the step 161 is carried out to read the engine control foot pedal position $\alpha$ and a calculation is made in the step 162 to obtain a time differential $\alpha'$ of the foot pedal position $\alpha$. Then, a judgement is made in the step 163 as to whether the lever 70 is in the position L. When the answer is YES, the foot pedal position $\alpha$ is added with a constant value A as in the step 143 and, based on thus obtained value $\alpha$, the step 165 is carried out to read a desired transmission input speed TNPA. When the lever 70 is not in the position L, the speed TNPA is obtained based on the actual foot pedal position $\alpha$. Then, the step 166 is carried out to read the value M which is determined by the select switch 112 and the step 167 is carried out to judge whether the absolute value of the differential $\alpha'$ is greater than a reference value e.

When the absolute value of the differential $\alpha'$ is greater than the reference value e, a further judgement is made in the step 168 as to whether the value $\alpha'$ is positive or negative and the result of the judgement is memorized. Thereafter, in the step 169, the value M is added with a constant value D for acceleration or deceleration and the step 171 is carried out. When it is judged that the absolute value of the differential $\alpha'$ is not greater than the value e, a judgement is made in the step 170 as to whether the value $\alpha'$ has been changed from a negative value to a positive value or vice versa. If the answer is NO, the step 169 is carried out but if the answer is YES, the step 171 is carried out. In the step 171, the second desired transmission input speed TNPB is calculated by subtracting the value M from the first desired value TNPA to set up the hold zone. Thereafter, the step 148 is carried out.

According to this manual mode, the value M is manually determined by the select switch 112 so that a desired feeling can be selected by the operator. The switch 112 may be either of a type that can set the value M stepwisely or steplessly. Further, in the manual mode operation, the value M is increased for acceleration and deceleration so that the hold zone is widened.

The invention has thus been shown and described with reference to a specific embodiment, however, it should be noted that the invention is in no way limited to the details of the illustrated arrangements but changes and modifications may be made without departing from the scope of the appended claims.

We claim:

1. A steplessly variable transmission device comprising steplessly variable power transmission means including an input means adapted to be driven by engine means, an output means, and a variable speed ratio means between said input and output means for steplessly changing a speed ratio between said input and output means, actuator means for actuating the variable speed ratio means for obtaining a desired value of said speed ratio, control means responsive to an operating condition of the engine means to produce an output signal in accordance with speed ratio control characteristics having a shift-up zone, a shift-down zone and a speed ratio hold zone for controlling the actuator means so that a desired value of the speed ratio is obtained, said shift-up zone, said shift-down zone and said speed ratio hold zone being determined as functions of load on said engine means and a speed related to the speed of said engine means, said speed ratio hold zone being between said shift-off zone and said shift-down zone, said zones being defined by a map having a first shift curve for defining the shift-up zone, said speed ratio hold zone being defined by said first shift curve and a second shift curve which is spaced toward the shift down zone from the first shift curve.

2. A transmission in accordance with claim 1 which includes manually operated select switch means, said control means including means for determining width of said speed ratio hold zone in accordance with signal from said select switch means.

3. A transmission in accordance with claim 1 in which said control means includes means for detecting at least one of acceleration and deceleration and means for increasing the speed ratio hold zone in said one of the acceleration and deceleration.

4. A transmission in accordance with claim 1 in which said speed ratio hold zone is changed in width in accordance with vehicle speed so that the width is decreased in response to an increase in the vehicle speed.

5. A transmission in accordance with claim 1 in which said control means includes means for producing a speed ratio hold signal for maintaining the speed ratio constant in vehicle acceleration when the operating condition of the engine means is shifted across the second shift curve to the first shift curve until the operation condition is shifted across the first shift curve to the shift-up zone.

6. A transmission in accordance with claim 5 in which said control means includes further means for producing a shift-up signal in acceleration when the operating condition of the engine means is shifted across the first shift curve to the shift-up zone after the operating condition is shifted across the second shift curve to the shift-down zone.

7. A transmission in accordance with claim 1 in which said control means includes means for producing a speed ratio hold signal for maintaining the speed ratio constant in vehicle deceleration when the operating condition of the engine means is shifted from the shift-up zone to speed ratio hold zone until the operating condition is shifted from the speed ratio hold zone to the shift-down zone.

8. A transmission in accordance with claim 7 in which said control means includes further means for producing a shift-down signal in deceleration when the operating condition of the engine means in shifted to the shift-down zone after the operating condition is shifted from the speed ratio hold zone to the shift-up zone.

9. A transmission in accordance with claim 1 in which said control means includes memory means memorizing said shift-up zone, said shift-down zone and the speed ratio hold zone.

10. A transmission in accordance with claim 1 in which said actuator means in hydraulically operated means, said control means including solenoid value means for controlling supply of hydraulic pressure to said actuator means.

* * * * *